US010533704B2

(12) United States Patent
Divisi

(10) Patent No.: US 10,533,704 B2
(45) Date of Patent: Jan. 14, 2020

(54) PNEUMATIC IMMERSION LUBRICANT PUMP

(71) Applicant: DROPSA S.p.A., Milan (IT)

(72) Inventor: Walter Divisi, Monaco (MC)

(73) Assignee: DROPSA S.P.A., Milan (IT)

( * ) Notice: Subject to any disclaimer, the term of this patent is extended or adjusted under 35 U.S.C. 154(b) by 200 days.

(21) Appl. No.: 15/790,686

(22) Filed: Oct. 23, 2017

(65) Prior Publication Data

US 2018/0119880 A1 May 3, 2018

(30) Foreign Application Priority Data

Oct. 27, 2016 (IT) .......................... 102016000108856

(51) Int. Cl.
*F16N 13/16* (2006.01)
*F04B 53/16* (2006.01)
*F16J 15/18* (2006.01)

(52) U.S. Cl.
CPC ............ *F16N 13/16* (2013.01); *F04B 53/164* (2013.01); *F16J 15/182* (2013.01)

(58) Field of Classification Search
CPC ...... F04B 53/164; F04B 9/1315; F04B 9/131; F04B 23/021; F04B 3/164; F16N 13/16
USPC ......................................................... 184/26
See application file for complete search history.

(56) References Cited

U.S. PATENT DOCUMENTS

| 3,609,066 A * | 9/1971 | Wegmann | F04B 7/04 |
| | | | 417/344 |
| 3,787,147 A * | 1/1974 | McClocklin | F04B 9/12 |
| | | | 417/302 |
| 2010/0006056 A1* | 1/2010 | Aamand | F01M 1/08 |
| | | | 123/196 R |

FOREIGN PATENT DOCUMENTS

| EP | 0120522 A1 | 10/1984 |
| GB | 2020378 A | 11/1979 |

OTHER PUBLICATIONS

Search Report and Written Opinion dated Jun. 14, 2017 for Italian patent application No. 102016000108856.

* cited by examiner

*Primary Examiner* — Michael R Mansen
*Assistant Examiner* — Mark K Buse
(74) *Attorney, Agent, or Firm* — Vorys, Sater, Seymour and Pease LLP

(57) ABSTRACT

A pneumatic immersion lubricant pump, including a primary piston sliding in a sealed manner in contrast to at least one spring inside a cylindrical body together with which the primary piston defines a chamber provided on an opposite side of the primary piston with respect to that where the at least one spring is positioned, a body of the pump including at least one channel in which an element projecting from the primary piston is slidably housed in a sealed manner. The body of the pump including a plurality of cylinders each equipped with a loading port open on the outside of the pump body. Each cylinder housing a secondary piston axially constrained to the primary piston. The projecting element and the channel defining a pressurization duct of the chamber.

19 Claims, 3 Drawing Sheets

PNEUMATIC IMMERSION LUBRICANT PUMP

This claims the benefit of Italian patent application no. 102016000108856, filed Oct. 27, 2016.

FIELD OF THE INVENTION

The present invention relates to a pneumatic immersion lubricant pump.

The invention also relates to a pumping system that comprises an immersion pump.

BACKGROUND

Immersion pumps that are commonly known in the lubrication field are very complex and are formed by many parts.

They also provide a plurality of outlets that are located on various surfaces of the pump. It is therefore quite complex to connect the ducts required for the proper operation of the pump to the various outlets.

SUMMARY OF THE INVENTION

It is the object of the present invention to provide a pneumatic immersion lubricant pump that is simplified with respect to those currently known.

This and other objects are achieved by a pneumatic pump made according to the technical teachings of the appended claims.

BRIEF DESCRIPTION OF THE DRAWINGS

Further features and advantages of the invention shall be more apparent from the description of a preferred, but not exclusive, embodiment of the device, shown by way of non-limiting example, with the aid of accompanying figures, in which.

DETAILED DESCRIPTION OF THE INVENTION

With reference to the drawings mentioned, a pneumatic immersion lubricant pump is shown, indicated globally with numeral 1.

Figure 1:
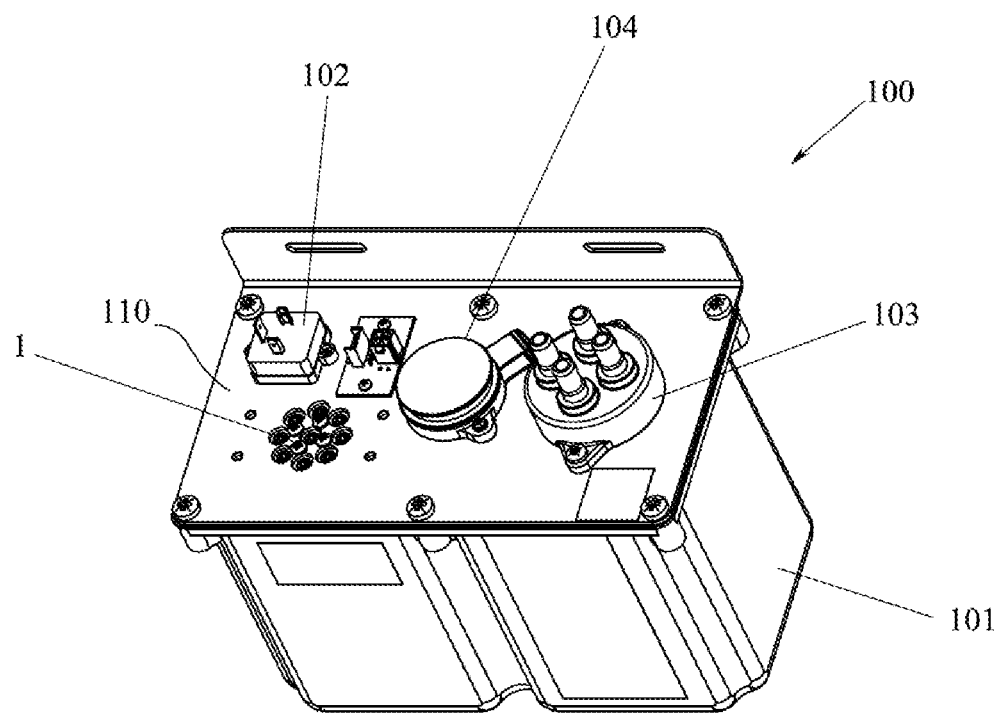
FIG. 1 is a perspective view of a pumping system according to the present invention.
Figure 4:
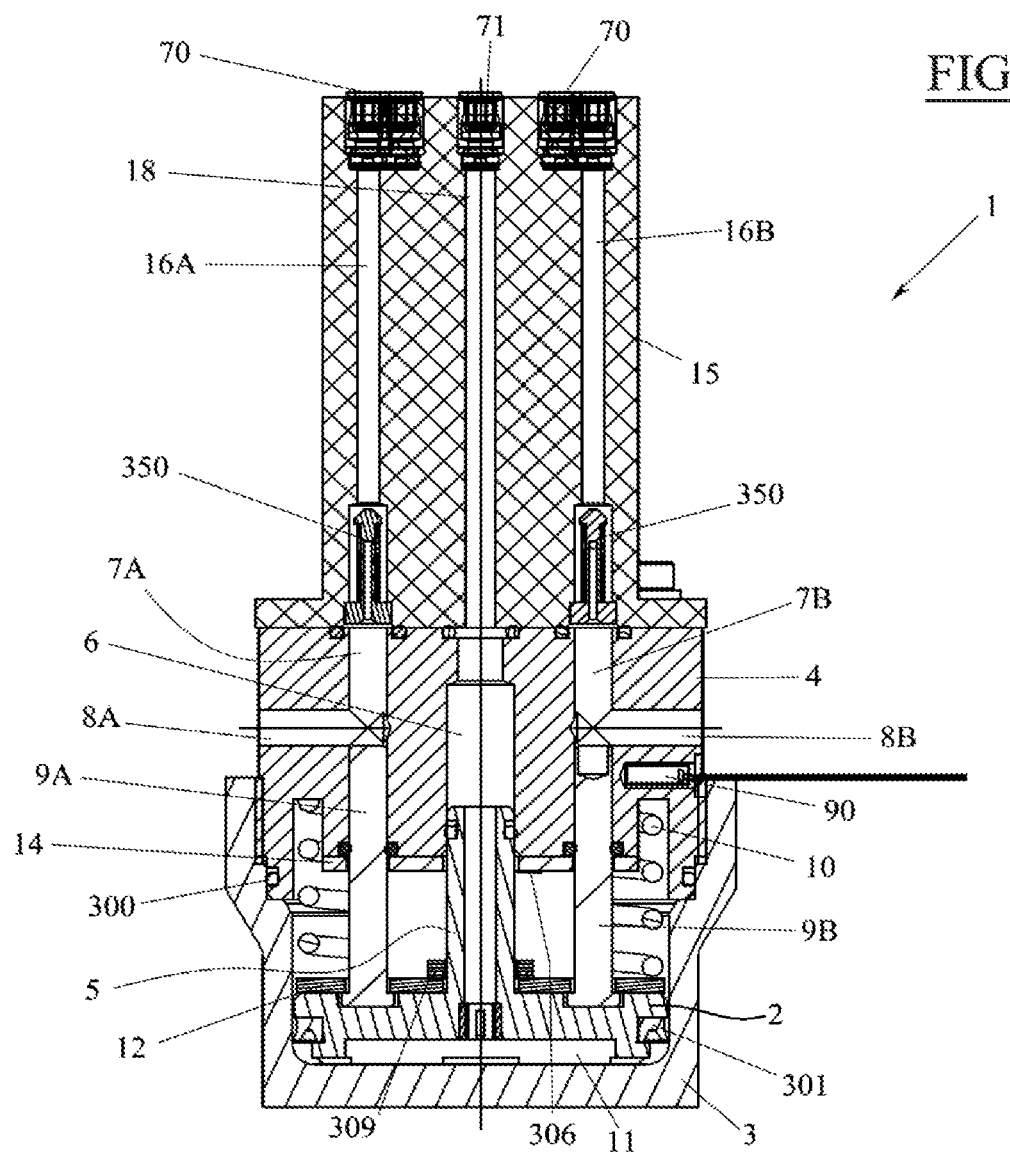
FIG. 4 is a sectional side view of a pneumatic immersion lubricant pump.

For simplicity of description, reference is made to FIG. 4, which shows a pneumatic immersion lubricant pump 1 integrated in the pumping system in FIG. 1.

The pneumatic pump 1 comprises a primary piston 2 sliding in a sealed manner in contrast to at least one spring 10 in a cylindrical body 3.

The cup-shaped cylindrical body 3 may be screwed or fixed in another manner to a body 4 of the pump.

The seal between the cylindrical body 3 (also termed herein as a cup-shaped body) and the body of the pump may be ensured by an O-ring 300.

The primary piston 2 may provide a sealing gasket 301 of the single or double lip type (or of other type). The cup-shaped body 3 and the piston define a chamber 11 that is provided on the opposite side of the primary piston with respect to the side where the spring 10 is placed.

As shown in FIG. 4, the body of the pump 4 comprises at least one channel 6 in which an element 5 projecting from the primary piston is slidably housed in a sealed manner. Specifically, the projecting element 5 may be made in one piece with the piston 2 or may be a substantially tubular element screwed (or fixed in another known manner) to the primary piston 2. Advantageously, the projecting element 5 may provide a groove adapted to house an O-ring that makes a seal on the inner surface of the channel 6, where the projecting element is slidably positioned in a sealed manner. Obviously, the seal between the projecting element 5 and the channel 6 made be made by means of other known methods.

The projecting element 5 and the channel 6 in fact define a pressurization duct of the chamber 11, since the projecting element comprises a fluid passage that puts the channel 6 and the chamber 11 in communication.

The body of the pump 4 comprises a plurality of cylinders 7A, 7B . . . each equipped with a loading port 8A, 8B . . . open on the outside of the pump body 4, and advantageously on one or more side surfaces of the pump body.

In the embodiment shown, the ports 8A, 8B . . . for introducing lubricant into the cylinders 7A, 7B . . . are arranged slightly above the edge of the cup-shaped body 3.

As shown in FIG. 4, each cylinder 7A, 7B houses a secondary piston 9A, 9B . . . axially constrained to the primary piston 2, and therefore axially translating therewith.

In the embodiment shown, the pump provides 8 outlets, and therefore 8 cylinders and 8 pistons (one cylinder for each piston, obviously) are provided.

It is worth noting that a first perforated plate 12 loaded (and advantageously kept in position) by the spring 10 is provided between the pump body 4 and the primary piston 2. Advantageously, there may be provided one or more centering pins 302 adapted to allow an alignment between the primary piston 2 and the first perforated plate 12.

Since each of the secondary pistons 9A, 9B has a mushroom-shaped head and is inserted in a hole specifically made in the first perforated plate 12, the latter in fact axially constrains the secondary pistons to the primary piston.

There may be provided one or more spacer rings 309 fitted on the projecting element 5 to adjust the stroke of the primary piston. Indeed, the primary piston stops its travel when a spacer ring 309 abuts with a portion 306 of the pump body 4.

Figure 5:
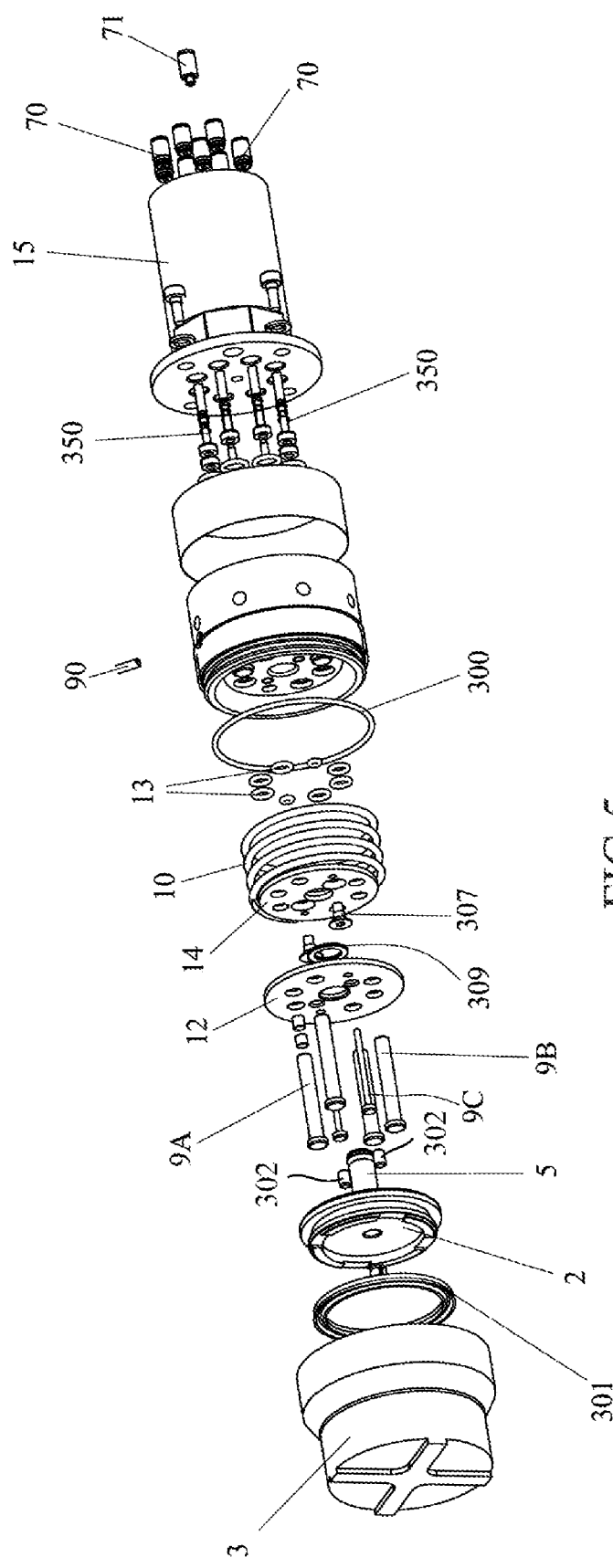
FIG. 5 is an exploded view of the pump in FIG. 4.

Obviously, to allow an effective adjustment of the volume of lubricant delivered by each individual piston, the length and/or the diameter of the secondary pistons may be different depending on the needs. It is worth noting from FIG. 5 that at least two of the secondary pistons 9B and 9C have a different diameter so as to deliver different volumetric quantities of lubricant.

A sealing O-ring 13 is provided between each secondary piston 9A, 9B . . . and the pump body 4. The sealing O-rings 13 may be kept in position by a second perforated plate 14 fixed to the pump body 4, for example by means of screws 307.

Advantageously, each cylinder 7A, 7B . . . is associated with a conventional non-return valve 350 to allow the operation of the pump.

Non-return valves may advantageously be interposed between the pump body 4 and a manifold 15 equipped with lubricant canals 16A, 16B . . . associated in a sealed manner with the cylinders 7A, 7B . . . .

The manifold 15 may also provide a compressed air canal 18 associated in a sealed manner with the channel 6 of the pump body 4.

Advantageously, the lubricant and compressed air canals face on a single surface S of the manifold. Thereby, all the pipes required for the operation of the pump may join on a single surface of the latter, thus simplifying the installation operations of the pump itself.

From the viewpoint of making the installation even simpler, each lubricant canal 16A, 16B . . . may be associated with a quick fastener 70 for a lubricant distribution pipe. Also the compressed air canal 18 is associated with a quick fastener 71 of a compressed air pipe.

As can be understood from the configuration of the pump, there is a need to pressurize the chamber 11 in a discontinuous manner for a proper operation of the pump.

Starting from the position in FIG. 4, the openings of the cylinders are arranged below the head of the lubricant (for example, oil or grease). Thereby, each cylinder is filled with lubricant.

The chamber 11 is therefore pressurized by means of the axial canal 5, 6.

Accordingly, the primary piston 2 raises to contrast the spring while simultaneously moving the secondary pistons 9A, 9B . . . constrained thereto, which deliver the lubricant trapped therein toward the non-return valves 350, once the level of the openings of the cylinders is exceeded.

When the spacer(s) 309 abut with the pump body 4, and specifically the portion 306 of the second perforated plate which is integral with the pump body, the movement of the primary piston stops.

Here, a sensor 90 for detecting an end of stroke position of said primary piston 2 (for example, a REED sensor associated with a small magnet positioned on or integrated in the primary piston, or a Hall sensor) may be activated; the sensor 90 may control the interruption of the pressurization of the chamber 11 and the connection thereof to a vent (again by means of the only duct 5/6) to allow the return of the primary piston 2 (pushed by the spring 10) to the position in FIG. 4.

Figure 2:
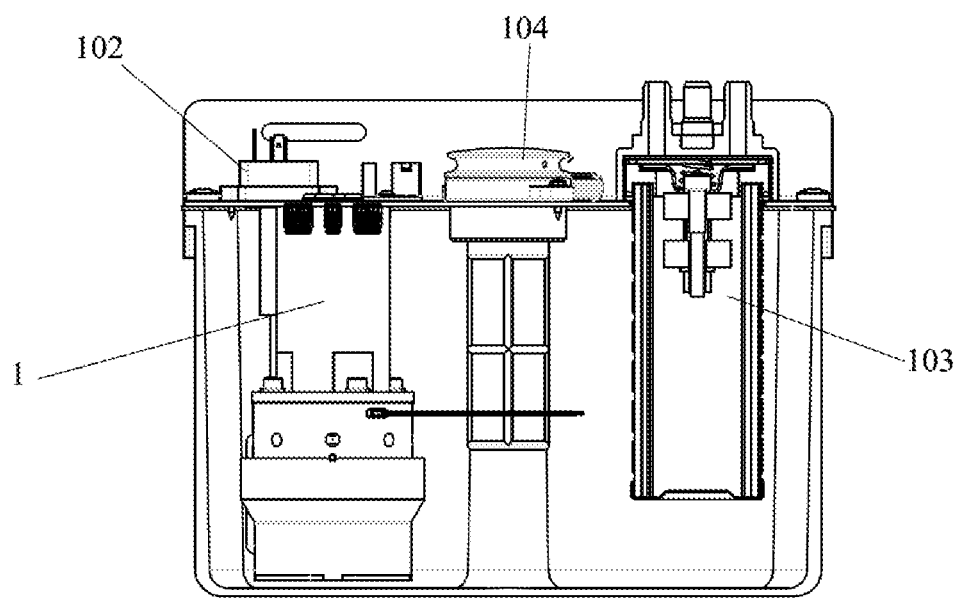
FIG. 2 is a sectional side view (without sectional lines) of the pumping system in FIG. 1.
Figure 3:
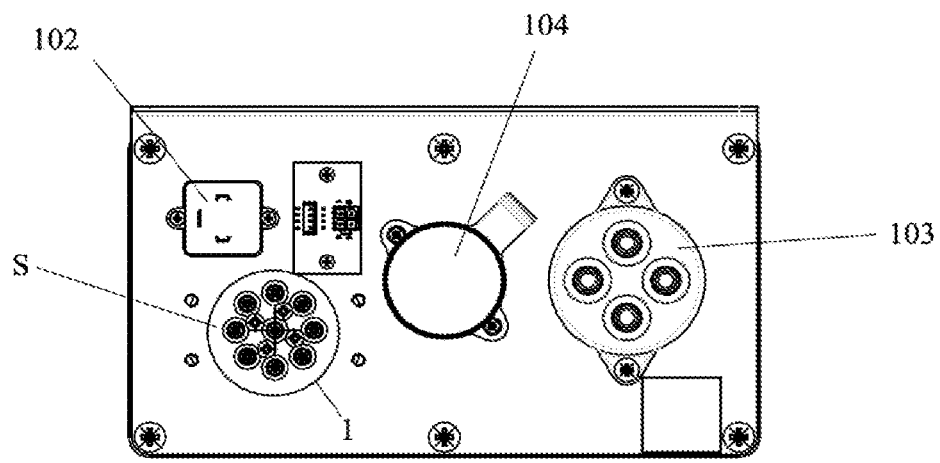
FIG. 3 is a top view of the system in FIG. 1.

Advantageously, the above-described pump 1 may be integrated in a lubricant pumping system 100 (shown in FIGS. 1 to 3). It may comprise a reservoir 101 housing the pump 1 therein, for example constrained by means of the manifold 15 to a cover 110 of the reservoir 101.

The system 100 may also provide a lubricant level sensor 102 and a filter 103 for the return of the lubricant (possibly comprising a magnet) and/or a closable filling opening 104 associated with a filtering element.

Some embodiments of the invention have been described, but just as many more could be conceived by taking advantage of the same innovative concept.

The invention claimed is:

1. A pneumatic immersion lubricant pump, comprising
a primary piston sliding in a sealed manner, in contrast to at least one spring, inside a cylindrical body together with which said primary piston defines a chamber provided on an opposite side of the primary piston with respect to that where said at least one spring is positioned,
a body of the pump comprising at least one channel in which an element projecting from the primary piston is slidably housed in a sealed manner, the body of the pump comprising a plurality of cylinders each equipped with a loading port open on the outside of the pump body,
each cylinder housing a secondary piston axially constrained to the primary piston,
the projecting element and the channel defining a pressurization duct of the chamber.

2. The lubricant pump according to claim 1, wherein between the pump body and the primary piston there is a first perforated plate loaded by said spring and wherein the plurality of secondary pistons is axially constrained to said primary piston through said first perforated plate.

3. The lubricant pump according to claim 1, wherein at least two of said secondary pistons have a different diameter, so as to deliver different volumetric quantities of lubricant.

4. The pump according to claim 1, wherein between each secondary piston and the pump body a sealing O-Ring is provided, each sealing O-Ring being kept in position by a second perforated plate fixed to the pump body.

5. The pump according to claim 1, wherein each cylinder is associated with a non-return valve.

6. The pump according to claim 5, wherein a manifold is provided that is equipped with lubricant canals associated in a sealed manner with said cylinders and with at least one compressed air canal associated in a sealed manner with said channel of the pump body, the lubricant and compressed air canals facing on a surface of the manifold.

7. The pump according to claim 6, wherein each lubricant canal is associated with a quick fastener for a lubricant distribution pipe, and wherein said compressed air canal is associated with a quick fastener of a compressed air pipe.

8. The lubricant pumping system, comprising a reservoir inside which a pump according to claim 7 is housed.

9. The pump according to claim 6, wherein each lubricant canal is associated with a quick fastener for a lubricant distribution pipe.

10. The pump according to claim 6, wherein said compressed air canal is associated with a quick fastener of a compressed air pipe.

11. The pump according to claim 1, comprising a sensor for detecting an end of stroke position of said primary piston.

12. The lubricant pumping system, comprising a reservoir inside which a pump according to claim 1 is housed.

13. The system according to claim 12, wherein the reservoir is associated with at least one member of the group consisting of
a lubricant level sensor,
a filter for the return of the lubricant and
a closable filling opening associated with a filtering element.

14. The system according to claim 12, wherein the reservoir is associated with a lubricant level sensor.

15. The system according to claim 12, wherein the reservoir is associated with a filter for the return of the lubricant.

16. The system according to claim 12, wherein the reservoir is associated with a closable filling opening, associated with a filtering element.

17. The system according to claim 12, wherein the reservoir is associated with at least one member of the group consisting of
a lubricant level sensor,
a filter for the return of the lubricant, comprising a magnet, and
a closable filling opening associated with a filtering element.

18. The lubricant pump according to claim 1, wherein between the pump body and the primary piston there is a first perforated plate loaded by said spring.

19. The lubricant pump according to claim 1, wherein the plurality of secondary pistons is axially constrained to said primary piston through said first perforated plate.

\* \* \* \* \*